United States Patent
Querejeta Andueza et al.

(10) Patent No.: US 8,413,648 B2
(45) Date of Patent: Apr. 9, 2013

(54) FUEL-FIRED BARBECUE

(75) Inventors: Félix Querejeta Andueza, Vitoria-Gasteiz (ES); JoséJoaquin Antxia Uribetxebarria, Aretxabaleta (ES); Aitor Zabalo Bayón, Mondragon (ES); Iñigo Albizuri Landa, Muxika (ES); José Ignacio Múgica Odriozola, Bergara (ES)

(73) Assignee: Coprecitec, S.L., Aretxabaleta (Gipuzkoa) (ES)

( * ) Notice: Subject to any disclaimer, the term of this patent is extended or adjusted under 35 U.S.C. 154(b) by 719 days.

(21) Appl. No.: 12/340,253

(22) Filed: Dec. 19, 2008

(65) Prior Publication Data

US 2009/0159068 A1 Jun. 25, 2009

(30) Foreign Application Priority Data

Dec. 24, 2007 (ES) .................................. 200703424

(51) Int. Cl.
*A47J 37/00* (2006.01)
(52) U.S. Cl.
USPC ................... 126/25 R; 126/41 R; 126/39 BA; 126/39 E; 126/39 R; 431/25; 431/116

(58) Field of Classification Search ................ 126/25 R, 126/41 R, 39 BA, 39 E, 39 R; 431/25, 116
See application file for complete search history.

(56) References Cited

U.S. PATENT DOCUMENTS

| | | | | |
|---|---|---|---|---|
| 2,595,171 | A | * | 4/1952 | Schaefer .......................... 236/33 |
| 2,870,835 | A | * | 1/1959 | Lundgren ........................ 431/46 |
| 3,884,413 | A | * | 5/1975 | Berquist ..................... 236/15 A |
| 4,543,974 | A | * | 10/1985 | Dietiker et al. ................. 137/66 |
| 5,033,449 | A | * | 7/1991 | Hanagan .................. 126/39 BA |
| 5,607,294 | A | * | 3/1997 | Gianpiero et al. .............. 431/46 |
| 5,813,394 | A | | 9/1998 | Clifford |
| 6,037,571 | A | | 3/2000 | Christopher |

FOREIGN PATENT DOCUMENTS
FR 2479676 10/1981

\* cited by examiner

*Primary Examiner* — Avinash Savani
(74) *Attorney, Agent, or Firm* — Tim L. Kitchen; Peter B. Scull; Hamilton, DeSanctis & Cha LLP

(57) ABSTRACT

A barbecue having a manual operating mode and an automatic operating mode. In the manual operating mode a user is required to act affirmatively on the burner or burners of the barbecue in order to light them. In the automatic operating mode, a controller operably controls an igniter and/or a pilot to automatically light the burner or burners without the need for a user to affirmatively act on the burners themselves.

20 Claims, 2 Drawing Sheets

FUEL-FIRED BARBECUE

CROSS-REFERENCE TO RELATED APPLICATIONS

This application claims priority to Spanish Patent Application No. P200703424, filed Dec. 24, 2007.

TECHNICAL FIELD

The present invention relates to barbecues, and more specifically to domestic barbecues fired by a fuel such as natural gas or propane gas.

BACKGROUND

Barbecues comprise at least one hot surface upon which food may be disposed so that it may be cooked. The prior art contains known barbecues that comprise a main inlet through which fuel may be introduced in order to heat the hot surface and thus cook the food disposed on it. The fuel used is mainly natural gas or propane gas. A burner is disposed beneath the hot surface and the fuel reaches it through a through-pipe that connects said burner to the main inlet, and the fuel is ignited in said burner (in the form of a flame) and causes the heating of the hot surface and, therefore, the heating of the food disposed on said hot surface.

In some barbecues, once the fuel has reached the burner a user has to act directly on said burner to ensure the fuel lights, by means of a lighter, for example, or a similar device.

U.S. Pat. No. 5,813,394 discloses a barbecue in which the flame of the burner is ignited automatically, without the need for a user to act on the burner directly by means of a lighter or a similar device. For this reason, said barbecue comprises electronic control means that act on an igniter that causes the fuel to ignite.

SUMMARY OF THE DISCLOSURE

It is an object of the invention to provide an alternative barbecue to known barbecues in the prior art.

A barbecue in one implementation comprises at least one cooking surface upon which food may be cooked, a burner disposed beneath the cooking surface to cause the heating of said surface, and a main inlet through which fuel may reach the burner to allow the heating of the cooking surface when said fuel lights in said burner. The barbecue also comprises first and second through-pipes that connect the main inlet to the burner and through which fuel may pass from said main inlet to said burner, a multi-position gas inlet control valve for allowing fuel to pass to the burner through the first through-pipe when it is in a first position or through the second through-pipe when it is in a second position, and a flow valve linked to the through-pipes and the burner, by means of which the user may regulate the amount of fuel that reaches said burner when the control valve is in the first or the second position.

The barbecue also includes electro-mechanical control means that is activated when the control valve is positioned to direct gas flow through the second through-pipe. The electro-mechanical control means designed to allow or prevent the passage of the fuel through said second through-pipe when the control valve is disposed in the second position. In one embodiment the barbecue 100 also includes a gas pilot linked to the burner to cause, by means of the control means, said gas pilot to light the fuel that reaches said burner, an auxiliary pipe that connects the main inlet to the gas pilot and through which the fuel may pass from said main inlet to said gas pilot when the control valve is disposed in the second position, and an electrical power supply for providing electrical power to the control means.

As a result, and thanks to the control valve and the presence of two through-pipes that connect the main inlet to the burner, the barbecue may operate in two different operating modes. In the first operating mode the user places the control valve in the first position and affirmatively acts to cause the burner to light by means of lighting means such as a lighter, a manually activated spark device affixed to the barbecue, or similar means. In the second operating mode the user places the control valve in the second position and the control means receives power from the power supply and acts to cause the burner to light automatically.

Thus, the user may select the second operating mode when he wants to operate the barbecue in a more comfortable way, for example, or the first operating mode when he desires or when, for example, it is not possible to supply electrical power to the control means and it is not possible, therefore, to operate in the second operating mode.

These and other advantages and characteristics of the invention will be made evident in the light of the drawings and the detailed description thereof.

DETAILED DESCRIPTION

Figure 1:
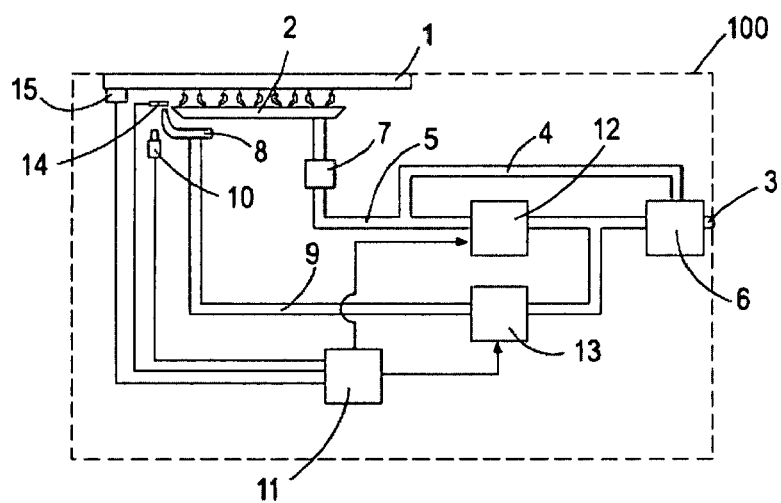
FIG. 1 schematically shows a barbecue in an embodiment of the present invention.

FIG. 1 shows an embodiment of a barbecue 100 of the present invention, which comprises at least one cooking surface 1 upon which food may be disposed so that it may be cooked, at least one burner 2 disposed beneath the cooking surface 1 to cause the heating of said cooking surface 1, and a main fuel inlet 3 through which a fuel may be provided to the burner 2 in order to heat the cooking surface 1, said fuel lighting in said burner 2. Preferably the fuel is natural gas or propane gas, a flame being caused in the burner 2 (the lighting of said burner 2) when said fuel is ignited to cause said flame to heat the cooking surface 1. The barbecue 100 may be designed to connect the main inlet 3 directly to the general gas inlet of a house, for example, and/or may be designed to connect said main inlet 3 to a gas cylinder (not shown in the figures).

In order to guide the fuel from the main inlet 3 to the burner 2 the barbecue 100 has a first through-pipe 4 and a second through-pipe 5 that connect said main inlet 3 to said burner 2, the fuel passing through one of said pipes 4 and 5 from said main inlet 3 to reach said burner 2. Said through-pipes 4 and 5 may be completely independent or they may comprise a common part that corresponds to the end that reaches the burner 2, as shown in FIG. 1. The barbecue 100 also has a gas control valve 6, preferably a conventional three-position valve although it may also be of another type to allow the fuel to pass from the main inlet 3 to the burner 2 through the first through-pipe 4 or through the second through-pipe 5, or to prevent the fuel from passing through any of said through-pipes 4 and 5. Thus, when the control valve 6 is in a first position M the fuel is allowed to pass to the burner 2 through the first through-pipe 4, said fuel being allowed to pass to the burner 2 through the second through-pipe 5 when said control valve 6 is in a second position A, the fuel being prevented from passing through both through-pipes 4 and 5 at the same time. In a third position O, the fuel is prevented from passing through either of the two through-pipes 4 and 5.

The barbecue 100 also has a flow valve 7 linked to the burner 2 and to both through-pipes 4 and 5, with the result that when the control valve 6 is in the first position M or in the second position A, a user may regulate the amount of fuel that reaches the burner 2 through either of said through-pipes 4 and 5 by acting on said flow valve 7. The flow valve 7 is preferably of the conventional rotary type, causing said valve to allow more or less fuel to pass through in accordance with the position of said flow valve 7 when it is operated on (in accordance with the rotation of a control knob 17 in relation to an inactive OFF position). Said flow valve 7 having an inactive OFF position, in which it prevents any fuel from passing to the burner 2, thereby preventing the heating of the cooking surface 1 until the position of said flow valve 7 is modified.

Due to the two through-pipes 4 and 5 and the characteristics of the control valve 6, the barbecue 100 is designed to operate in two different operating modes. To ensure that said barbecue 100 operates in a first operating mode, a user places the control valve 6 in the first position M, thereby allowing fuel to pass from the main inlet 3 to the burner 2 through the first through-pipe 4, while for it to operate in a second operating mode, the user has to place said control valve 6 in the second position A, thereby allowing fuel to pass from said main inlet 3 to said burner 2 through the second through-pipe 5.

When the first operating mode is selected the fuel is allowed to pass to the burner 2 through the first through-pipe 4, and by acting on the flow valve 7 the user may also regulate the amount of fuel that reaches the burner 2. In order to cause the fuel to ignite in said burner 2 (the lighting of the flame), the user has to act affirmatively on said burner 2 by means of a manual igniter such as a lighter, a manually actuated spark device affixed to the barbecue, or a similar device.

When the second operating mode is selected the fuel is allowed to pass to the burner 2 through the second through-pipe 5, and by acting on the corresponding flow valve 7, the user may also regulate the amount of fuel that reaches the burner 2. In said second operating mode the user does not have to act on the burner 2 in order to light the fuel, and for this reason the barbecue 100 includes an automatic igniter 10 and a controller/electronic control means 11 that may include, for example, a microprocessor or a microcontroller, which causes the fuel of the burner 2 to light by means of the igniter 10 and which is electronically linked to the control valve 6, said controller 11 being capable of determining the position of said control valve 6. Preferably the igniter 10 comprises a spark generator and the controller 11 causes sparks to be generated when it detects that the control valve 6 moves to the second position A. The igniter 10 may also comprise a hot-igniter, with the result that said controller 11 sends, in this case, a current to the igniter 10 in order to heat it when it is detected that said control valve 6 passes to said second position A. Preferably, the barbecue 100 also includes a gas pilot 8 disposed beneath or adjacent to the burner 2, an auxiliary pipe 9 that connects the main fuel inlet 3 to the gas pilot 8 and through which fuel may pass to said gas pilot 8, an electric valve 12 disposed in the second pipe 5 and an auxiliary electric valve 13 disposed in the auxiliary pipe 9. Said barbecue 100 may comprise a gas pilot 8 for each burner 2 or a gas pilot 8 common to all the burners when it has more than one burner. When the user selects the second operating mode, the controller 11 detects said selection and acts on the electric valve 12 and on the auxiliary electric valve 13 in order to allow the fuel to pass through the second through-pipe 5 and through the auxiliary pipe 9, fuel thus able to reach the burner 2 and the gas pilot 8. The controller 11 causes said igniter 10 to generate at least one sequence of sparks when fuel is allowed to pass through the auxiliary pipe 9. The igniter 10 is disposed adjacent to the gas pilot 8, the sparks causing the gas pilot 8 to light, with the flame of said gas pilot 8 causing the fuel that reaches the burner 2 to light and thereby light said burner 2, thus heating the cooking surface 1. Said igniter 10 may also be disposed adjacent to the burner 2, directly causing said burner 2 to light without the need for the gas pilot 8, the auxiliary pipe 9 and the auxiliary electric valve 13.

Figure 2:
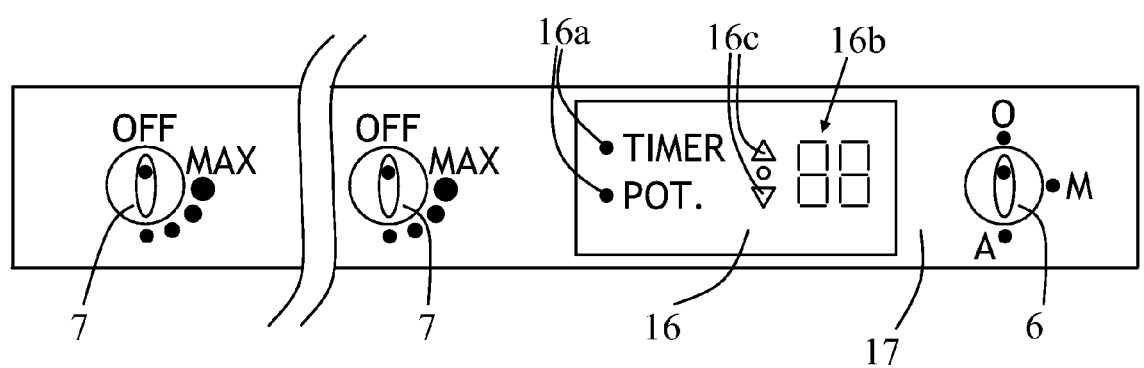
FIG. 2 is a front view of a control panel in an embodiment of the present invention.

Thanks to the control means 11 the second operating mode is flexible, the user being able to select different functions in said second operating mode, such as a timer function or a power control function for example. Thus, the power may be controlled by the cyclical switching on/switching off of the burner 2 for example, the control means 11 acting on the electric valve 12 to allow or prevent the passage of the fuel to said burner 2, the fuel being allowed to pass through said second through-pipe 5 by means of the control valve 6. In the case that there is a gas pilot 8, said gas pilot 8 may remain lit with the control means 11 continuing to allow fuel to pass through the auxiliary pipe 9, with the result that when fuel is allowed to pass to said burner 2 again there is no need to cause sparks to be generated (or to allow current to pass through the igniter 10 in the case that there is a hot-igniter), the flame of said gas pilot 8 being the one that causes the fuel of the burner 2 to light. If there is no gas pilot 8, the control means 11 generate sparks (or a current through the igniter 10) to cause the fuel of the burner 2 to light. In a preferred embodiment, the barbecue 100 includes a user interface 16, shown in FIG. 2, by means of which a user may select desired functions. Said user interface 16 may include a conventional button or key 16*a* (or touch pads for example) linked to each function and said functions would be pre-installed in said barbecue 100, the control means 11 executing the function selected by the user. The user interface 16 may also comprise at least one display 16*b* of the type comprising eight segments, for example, and displaying the parameters of at least one of the functions, and buttons or keys 16*c* (or touch pads) linked to said display 16*b* to increase or reduce the value of the parameter displayed on said display 16*b* (of the function selected by the user). In one embodiment, the user interface 16, the control valve 6 and the flow valve 7 are disposed in a control panel 18 of the barbecue 100, which is also disposed in a location accessible to the user, such as the front of said barbecue 100, the side or even the top part, adjacent to the cooking surface 1.

The barbecue 100 may also have a thermocouple 14 adjacent to the gas pilot 8 to detect the flame in said gas pilot 8, and a temperature sensor 15 to detect the temperature of the cooking surface 1, both the thermocouple 14 and the temperature sensor 15 being connected to the control means 11. Thus, said control means 11 may determine the presence or absence of a flame in said gas pilot 8 and the temperature of said cooking surface 1.

The barbecue 100 may also include supply means, not shown in the figures, to provide electrical power to the controller/control means, said supply means thereby allowing the barbecue 100 to be operated in the second operating mode. Said supply means may comprise a battery disposed in the barbecue 100 or connection means (a plug, for example) to connect said barbecue 100 to an external power source, such as a mains supply, and thereby supply the controller/control means 11. If the supply means fails or is not available, it will not be possible to operate in the second operating mode, and the user may select the first operating mode to operate the barbecue 100.

It is appreciated that the invention may also be used in barbecues with two or more independent cooking surfaces 1. In this case, each cooking surface 1 may have a control valve 6, a burner 2, a first through-pipe 4, a second through-pipe 5 and a flow valve 7. The main inlet 3 and the control means 11 may be common to all the cooking surfaces 1. In this case, the barbecue 100 may also include a gas pilot 8, an auxiliary pipe 9 and an igniter 10 for each cooking surface, or a gas pilot 8, an auxiliary pipe 9 and an igniter 10 common to all the cooking surfaces 1.

What is claimed is:

1. A gas fueled barbecue having a cooking surface that is heated by a burner comprising:
   a gas inlet control valve moveable between a manual position, an automatic position and an off position, the gas inlet control valve having a gas inlet and a first gas outlet and a second gas outlet, in the manual position gas being delivered to the burner through a first through pipe connected to the first gas outlet, in the automatic position gas being delivered to the burner through a second through pipe connected to the second gas outlet, and in the off position gas being prevented from entering the first and second through pipes, and
   a controller operably connected to and capable of determining the position of the gas inlet control valve, the controller controlling the operation of an igniter positioned near the burner and the operation of a first electrically actuated valve positioned in the second through pipe, the igniter configured to light the burner when gas flows to the burner, the controller configured to supply electrical power to the first electrically actuated valve and to the igniter so as to open the first electrically actuated valve and to activate the igniter when the control valve is in the automatic position, when the gas inlet control valve is in the manual position and in the off position the controller is configured not to supply electrical power to the first electrically actuated valve and the igniter so that the first electrically actuated valve assumes a closed position and the igniter is not activated.

2. A barbecue according to claim 1 further comprising a flow valve positioned between the burner and the first and second through pipes for regulating the flow rate of gas to the burner, the flow valve being located in a downstream flow path to the first electrically actuated valve in the second through pipe.

3. A barbecue according to claim 1 further comprising a thermocouple positioned near the burner and operably connected to the controller, the controller configured to terminate the supply of electrical power to the igniter when the thermocouple temperature exceeds a predetermined value.

4. A barbecue according to claim 1 further comprising a temperature sensor for sensing the temperature of the cooking surface, the temperature sensor connected to the controller, the controller configured to control the position of the first electrically actuated valve in accordance with the temperature sensed by the temperature sensor in order to control the temperature of the cooking surface.

5. A barbecue according to claim 1 wherein the controller has a display, the barbecue further comprising a control panel from where the position of the gas inlet control valve may be manipulated, the display located on the control panel.

6. A barbecue according to claim 4 wherein the controller has a display and a keypad to permit a user to input a desired temperature of the cooking surface, the barbecue further comprising a control panel from where the position of the gas inlet control valve may be manipulated, the display and keypad located on the control panel.

7. A gas fueled barbecue having a cooking surface that is heated by a burner comprising:
   a gas inlet control valve moveable between a manual position, an automatic position and an off position, the gas inlet control valve having a gas inlet and a first gas outlet and a second gas outlet, in the manual position gas being delivered to the burner through a first through pipe connected to the first gas outlet, in the automatic position gas being delivered to the burner through a second through pipe connected to the second gas outlet, and in the off position gas being prevented from entering the first and second through pipes,
   a controller operably connected to and capable of determining the position of the gas inlet control valve, the controller controlling the operation of an igniter and the operation of a first electrically actuated valve positioned in the second through pipe, the controller configured to supply electrical power to the first electrically actuated valve and to the igniter so as to open the first electrically actuated valve and to activate the igniter when the gas inlet control valve is in the automatic position, when the gas inlet control valve is in the manual position and in the off position the controller is configured not to supply electrical power to the first electrically actuated valve and the igniter so that the first electrically actuated valve assumes a closed position and the igniter is not activated; and
   a gas pilot positioned near the gas burner, the gas pilot having an auxiliary gas supply conduit having an inlet connected between the gas inlet control valve and the first electrically actuated valve in the second through pipe, the auxiliary gas supply conduit having a second electrically actuated valve which has an open position and a closed position, the position of the second electrically actuated valve being controlled by the controller, the controller configured to supply electrical power to the second electrically actuated valve so as to open the second electrically actuated valve to deliver gas to the pilot when the gas inlet control valve is in the automatic position, the distance between the igniter and the pilot permitting the pilot to be lit by the igniter, when the gas inlet control valve is in the manual position and in the off position the controller is configured not to supply electrical power to the second electrically actuated valve.

8. A barbecue according to claim 7 further comprising a flow valve positioned between the burner and the first and second through pipes for regulating the flow rate of gas to the burner, the flow valve being located in a downstream flow path to the first electrically actuated valve in the second through pipe.

9. A barbecue according to claim 7 further comprising a thermocouple positioned near the pilot and operably connected to the controller, the controller configured to terminate the supply of electrical power to the igniter when the thermocouple temperature exceeds a predetermined value.

10. A barbecue according to claim 7 further comprising a temperature sensor for sensing the temperature of the cooking surface, the temperature sensor connected to the controller, the controller configured to control the position of the first electrically actuated valve in accordance with the temperature sensed by the temperature sensor in order to control the temperature of the cooking surface.

11. A barbecue according to claim 7 wherein the controller has a display, the barbecue further comprising a control panel from where the position of the gas inlet control valve may be manipulated, the display located on the control panel.

12. A barbecue according to claim 10 wherein the controller has a display and a keypad to permit a user to input a desired temperature of the cooking surface, the barbecue further comprising a control panel from where the position of the gas inlet control valve may be manipulated, the display and keypad located on the control panel.

13. A gas fueled barbecue having a cooking surface that is heated by a burner comprising:
   a gas inlet control valve moveable between a manual position, an automatic position and an off position, the gas inlet control valve having a gas inlet and a first gas outlet and a second gas outlet, in the manual position gas being delivered to the burner through a first through pipe connected to the first gas outlet, in the automatic position gas being delivered to the burner through a second through pipe connected to the second gas outlet, and in the off position gas being prevented from entering the first and second through pipes,
   a controller operably connected to and capable of determining the position of the gas inlet control valve, the controller configured to control the operation of an igniter positioned near the burner and the operation of a first electrically actuated valve positioned in the second through pipe, the igniter configured to light the burner when gas flows to the burner, the controller configured to supply electrical power to the first electrically actuated valve and to the igniter so as to open the first electrically actuated valve and to activate the igniter when the gas inlet control valve is in the automatic position, when the control valve is in the manual position and in the off position the controller is configured not to provide electrical power to the first electrically actuated valve and the igniter so that the first electrically actuated valve assumes a closed position and the igniter is not activated,
   a thermocouple positioned near the burner and operably connected to the controller, the controller configured to terminate the supply of electrical power to the igniter when the thermocouple temperature exceeds a predetermined value, and
   a flow valve positioned between the burner and the first and second through pipes for regulating the flow rate of gas to the burner, the flow valve being located in a downstream flow path to the first electrically actuated valve in the second through pipe.

14. A barbecue according to claim 13 further comprising a temperature sensor for sensing the temperature of the cooking surface, the temperature sensor connected to the controller, the controller configured to control the position of the first electrically actuated valve in accordance with the temperature sensed by the temperature sensor in order to control the temperature of the cooking surface.

15. A barbecue according to claim 13 wherein the controller has a display, the barbecue further comprising a control panel from where the position of the gas inlet control valve and flow valve may be manipulated, the display located on the control panel.

16. A barbecue according to claim 14 wherein the controller has a display and a keypad to permit a user to input a desired temperature of the cooking surface, the barbecue further comprising a control panel from where the position of the gas inlet control valve and flow valve may be manipulated, the display and keypad located on the control panel.

17. A gas fueled barbecue having a cooking surface that is heated by a burner comprising:
   a gas inlet control valve moveable between a manual position, an automatic position and an off position, the gas inlet control valve having a gas inlet and a first gas outlet and a second gas outlet, in the manual position gas being delivered to the burner through a first through pipe connected to the first gas outlet, in the automatic position gas being delivered to the burner through a second through pipe connected to the second gas outlet, and in the off position gas being prevented from entering the first and second through pipes,
   a controller operably connected to and capable of determining the position of the gas inlet control valve, the controller controlling the operation of an igniter positioned near the burner and the operation of a first electrically actuated valve positioned in the second through pipe, the controller configured to supply electrical power to the first electrically actuated valve and to the igniter so as to open the first electrically actuated valve and to activate the igniter when the gas inlet control valve is in the automatic position, when the gas inlet control valve is in the manual position and in the off position the controller is configured not to supply electrical power to the first electrically actuated valve and the igniter so that the first electrically actuated valve assumes a closed position and the igniter is not activated,
   a flow valve positioned between the burner and the first and second through pipes for regulating the flow rate of gas to the burner, the flow valve being located in a downstream flow path to the first electrically actuated valve in the second through pipe,
   a gas pilot positioned near the gas burner, the gas pilot having an auxiliary gas supply conduit having an inlet connected between the control valve and the first electrically actuated valve in the second through pipe, the auxiliary gas supply conduit having a second electrically actuated valve which has an open position and a closed position, the position of the second electrically actuated valve being controlled by the controller, the controller configured to supply electrical power to the second electrically actuated valve so as to open the second electrically actuated valve to deliver gas to the pilot when the gas inlet control valve is in the automatic position, the distance between the igniter and the pilot permitting the pilot to be lit by the igniter, when the gas inlet control valve is in the manual position and in the off position the controller is configured not to supply electrical power to the second electrically actuated valve, and
   a thermocouple positioned near the pilot and operably connected to the controller, the controller configured to terminate the supply of electrical power to the igniter when the thermocouple temperature exceeds a predetermined value.

18. A barbecue according to claim 17 further comprising a temperature sensor for sensing the temperature of the cooking surface, the temperature sensor connected to the controller, the controller configured to control the position of the first electrically actuated valve in accordance with the temperature sensed by the temperature sensor in order to control the temperature of the cooking surface.

19. A barbecue according to claim 17 wherein the controller has a display, the barbecue further comprising a control panel from where the position of the gas inlet control valve and flow valve may be manipulated, the display located on the control panel.

20. A barbecue according to claim 18 wherein the controller has a display and a keypad to permit a user to input a desired temperature of the cooking surface, the barbecue further comprising a control panel from where the position of the gas inlet control valve and flow valve may be manipulated, the display and keypad located on the control panel.

* * * * *